United States Patent [19]

Lucas

[11] Patent Number: 4,989,091
[45] Date of Patent: Jan. 29, 1991

[54] SCAN CONVERTER FOR A HIGH DEFINITION TELEVISION SYSTEM

[75] Inventor: Keith Lucas, Oak Ridges, Canada

[73] Assignee: Scientific-Atlanta, Inc., Atlanta, Ga.

[21] Appl. No.: 344,830

[22] Filed: Apr. 28, 1989

Related U.S. Application Data

[63] Continuation-in-part of Ser. No. 272,064, Nov. 16, 1988.

[51] Int. Cl.$^5$ ............................................. H04N 7/01
[52] U.S. Cl. ..................................... 358/140; 358/11
[58] Field of Search .................................. 358/11, 140

[56] References Cited

U.S. PATENT DOCUMENTS 4,286,291 8/1981 Taylor et al. ........................ 358/138

(List continued on next page.)

FOREIGN PATENT DOCUMENTS

| 02026395 | 9/1980 | European Pat. Off. . |
|---|---|---|
| 0176674 | 10/1985 | European Pat. Off. . |
| 233720 | 8/1987 | European Pat. Off. . |
| 56-102180 | 8/1981 | Japan . |
| 58-212282 | 12/1983 | Japan . |
| 104866 | 6/1984 | Japan .................... 358/11 |
| 6126383 | 7/1984 | Japan . |
| 59-182626 | 10/1984 | Japan . |
| 60-134692 | 7/1985 | Japan . |
| 26383 | 2/1986 | Japan . |
| 62-274994 | 11/1987 | Japan . |
| 83/02704 | 8/1983 | PCT Int'l Appl. . |
| WO88/01462 | 2/1988 | World Int. Prop. O. . |

OTHER PUBLICATIONS

Isnardi et al, A Single Channel, NTSC Compatible Widescreen EDTV System, HDTV Colloquium, Ottawa, Canada, Oct. 4–8, 1987.
"Advanced Televisions", Robert Hopkins, IEEE Transactions on Consumer Electronics, Feb. 1988.
"Heirarchical High-Definition Television System Compatible with the NTSC Environment", Phillips Laboratories, Sep. 1987.
"B-MAC and HDTV-Does it Fit?", Dr. Keith Lucas, Digital Video Systems Corp., Oct. 1987.
"United States Advanced Systems Committee Report T2/62—Multiplexed Analog Component Television Broadcast System Parameter Specifications", Advance Television Systems Committee, Apr. 1987.

(List continued on next page.)

Primary Examiner—John W. Shepperd
Attorney, Agent, or Firm—Banner, Birch, McKie & Beckett

[57] ABSTRACT

A high definition B-MAC television signal transmission system comprises a scan converter and a signal pre-processor for accepting signals in various high definition formats. In particular, an 1125- line or 1050 line to 525 line scan converter is required due to the preponderance of at least 1125 line and to some extent 1050 line 60 Hertz field rate format high definition television studio equipment. The scan converter includes circuitry for converting from horizontal to vertical scan format via first and second field stores. A phase shift transversal filter spatially shifts every sample of each field by ¼ line. In alternate fields, the direction of spatial shifting reverses. For an interlace output, alternate line samples are discarded or for a sequential scan output, all samples are used. The output of the transversal filter is scan converted to reassume a horizontal scan format. Three field stores are used to buffer the input and output fields rates such that one field of samples is dropped every one thousand fields in order to convert from a 60 Hz field rate to 59.94 Hz. At the same time, the coefficients of the transversal filter are reversed for the next field of samples after the dropped field. The scan converter provides a digital 525 line 1:2 or, in another embodiment with two field rate converter circuits, a 1:1 format output. According to B-MAC signal processing, an interlace 525 line output is provided to a pre-processor which additionally may accept a 525 line analog RGB input. Also, the pre-processor may generate its own test pattern signals.

15 Claims, 9 Drawing Sheets

U.S. PATENT DOCUMENTS

| | | | |
|---|---|---|---|
| 4,291,331 | 9/1981 | Devereux | 358/13 |
| 4,292,652 | 9/1981 | Yumde et al. | 358/138 |
| 4,322,739 | 3/1982 | Drewery | 358/13 |
| 4,323,916 | 4/1982 | Dischert | 358/13 |
| 4,364,090 | 12/1982 | Wendland | |
| 4,449,143 | 5/1984 | Dischert et al. | 358/11 |
| 4,496,974 | 1/1985 | Heitmann | 358/180 |
| 4,520,385 | 5/1985 | Jackson et al. | 358/12 |
| 4,531,151 | 7/1985 | Hentschke | 358/135 |
| 4,535,352 | 8/1985 | Haskell | 358/16 |
| 4,551,753 | 11/1985 | Nishizawa et al. | 358/140 |
| 4,558,347 | 12/1985 | Pritchard et al. | 358/11 |
| 4,558,362 | 12/1985 | Sugiyama | 358/138 |
| 4,564,857 | 1/1986 | LoCicero et al. | 358/11 |
| 4,574,300 | 3/1986 | Hulyer | 358/12 |
| 4,581,640 | 4/1986 | Cole | 358/141 |
| 4,587,556 | 5/1986 | Collins | 358/11 |
| 4,603,350 | 7/1986 | Arbeiter et al. | 358/140 |
| 4,605,905 | 8/1986 | Goldberg et al. | 358/11 |
| 4,608,600 | 8/1986 | Sugiyama | 358/138 |
| 4,621,286 | 11/1986 | Reitmeier | 358/141 |
| 4,621,287 | 11/1986 | Reitmeier | 358/141 |
| 4,622,577 | 11/1986 | Reitmeier et al. | 358/11 |
| 4,630,099 | 12/1986 | Rzeszewski | 358/12 |
| 4,631,574 | 12/1986 | LoCicero et al. | 358/12 |
| 4,651,208 | 3/1987 | Rhodes et al. | 358/140 |
| 4,661,850 | 4/1987 | Strolle et al. | 358/140 |
| 4,665,427 | 5/1987 | Beckley et al. | 358/11 |
| 4,665,436 | 5/1987 | Osborne et al. | 358/136 |
| 4,672,424 | 6/1987 | Lechner | 358/11 |
| 4,694,338 | 9/1987 | Tsinberg | 358/141 |
| 4,698,675 | 10/1987 | Casey | 358/140 |
| 4,713,688 | 12/1987 | Guttner | 358/141 |
| 4,814,873 | 3/1989 | Maekawa | 358/11 |
| 4,831,463 | 5/1989 | Faroudja | 358/310 |
| 4,879,606 | 11/1989 | Walter et al. | 358/12 |

OTHER PUBLICATIONS

"Extended Definition TV Fully Compatible with Existing Standards", IEEE Transactions on Communications, Aug. 1984.

"A Single Channel, NTSC Compatible Widescreen EDTV System", Aug. 1989.

"Subsampling Techniques for High-Definition MAC", Haan and Crooijams.

"Compatible Wideband Single-Channel HDTV Transmission", CCIR Document JLWP, Sep. 1986.

IBM Technical Disclosure Bulletin, vol. II, No. 9, p. 1187, Feb. 1969.

"Direct Television Broadcast by Satellite Desirability of a New Transmission Standard", IBA Report 116/81, Sep. 1981.

"A DBTV System for Optimum Bandwidth Efficiency".

"The Sampling of Television Images", IBA Report 112/81, May 1981.

"Progress Report of HDTV in 1985", Sugimoto of I.H.K., Jun. 1986.

"Digital Sub-Nyquist Filters", J. H. Taylor, 1979, pp. 21–26.

"An Introduction to Sub-Nyquist Sampling", Barratt and Lucas, 1979, pp. 3–15.

"Extending PCN Video Response Above the Nyquist Limit", A. A. Goldberg.

"HDB-MAC, A Conditional-Access HDTV Transmission Format", Keith Lucas.

"HD-MAC: A Step Forward in the Evolution of Television Technology", Philips Technical Review, vol. 43, No. 8, Aug. 1987.

"Broad and Narrowband Compatible Single-Channel HDTV Transmission", Fernesh & Kino Technik, Jan. 1987.

1125 LINE SYSTEM - ONE VIDEO LINE

FIG. 2b

SCAN CONVERTER FOR A HIGH DEFINITION TELEVISION SYSTEM

This is a continuation-in-part of U.S. patent application Ser. No. 272,064 filed Nov. 16, 1988.

BACKGROUND OF THE INVENTION

1. Technical Field

The invention relates to the field of high definition television signal transmission and, in particular, to the conversion and pre-processing of a high definition television signal prior to transmission.

2. Description of the Relevant Art

It is already fairly recognized that the Japanese Broadcasting Corporation (NHK) has pioneered a viable implementation of broadcasting high definition television signal images to a population of subscribers via its high definition 1125-line MUSE signal format. Japanese manufacturers have developed and are making commercially available studio camera and recording equipment and television receivers which conform to the MUSE standard. On the other hand, a high definition 1125 line 60 Hz field rate format is not easily transmitted over great distances, for example, by satellite, without expensive installation of complicated transmission and reception equipment or greatly increasing the signal bandwidth.

In the United States of America and in other countries as well, it has not been decided what high definition television signal format will eventually be selected as a national standard. However, it is clear that conservation of transmission bandwidth and backwards compatibility with existing National Television System Committee (N.T.S.C.) standards is at least desirable if not demanded. Furthermore, regardless of what format will be selected as a broadcast standard, there will be a need for another transmission format which lends itself to efficient transmission by satellite or other long distance transmission facilities.

A standard and high definition B-type multiplexed analog components (B-MAC) transmission format is known from prior United States patent applications of the present inventor. According to one high definition B-MAC transmission format, the signal employs the 0–10.7 MHz region of the transmitted spectrum. Nevertheless, a 525 line interlaced high definition television (HDTV) signal is output in addition to six audio outputs, teletext, optional data transmission and optional on-screen messages and other features. However, a problem remains in defining how known camera and broadcast studio equipment operating in accordance with an 1125 line 60 Hz field rate format may properly interface with a high definition B-MAC television signal encoder so that the studio produced high definition signal may be transmitted over long distances without significant loss of high definition information. Furthermore, there is no particular discussion of how the disclosed high definition B-MAC television system will interface with other known possible input signal formats besides MUSE, such as 525 line 1:1 at a 59.94 Hz field rate or a 1050 line 2:1 signal operating at a 59.94 Hz field rate.

Consequently, there remains a requirement in the art for apparatus and a method of converting and preprocessing a studio produced high definition television signal into a signal for encoding via high definition B-MAC encoding techniques for transmission efficiently and without signal loss or degradation.

SUMMARY OF THE INVENTION

The problems and related deficiencies of known high definition television transmission systems are overcome by the principles of the present invention. Connected typically between a high definition B-MAC television signal encoder and broadcast studio equipment are a scan converter and a pre-processor according to the present invention.

The present scan converter operates at either 1125 lines per frame or 1050 lines per frame where a frame may comprise two successive "odd" and "even" interlaced fields or a frame comprises one high definition field in a sequential scan system. To alleviate difficulties presented by the considerable amount of existing studio production equipment for an 1125 line 2:1 interlaced 60 Hz field rate format, an 1125–525 line scan converter converts an 1125 line studio produced high definition signal or a 1050 line signal into a 525 line interlaced (or with an additional circuit) a sequential scan signal. Furthermore, the 60 Hz field rate is converted to 59.94 Hz. The scan converter particularly comprises a sampling circuit, a multi-tap vertical interpolator/filter having dynamically modifiable coefficients and a plurality of parallel connected field stores for storing field data. Prior to filtering, a pair of field stores accomplishes horizontal to vertical scan conversion. During filtering and writing steps, a total of seventy-five lines of samples from the top and bottom of a digital video image of an 1125 line signal are ignored while samples of image edges are cropped to reduce active line length. No samples are dropped from a 1050 line input. In this way, with either signal, a 16:9 aspect ratio is maintained. After filtering, three field stores are employed for vertical to horizontal conversion and changing field rates. While one store is written into, another field store is read from. However, because of the change in field rate from 60 Hz to 59.94 Hz, eventually the writing sequence overtakes the reading sequence and the writing operation into the three post-filter field stores is suspended for a field. At this time, the vertical interpolator/filter coefficients are inverted or reversed.

An image pre-processor is provided for accepting a digital interlace 525 line output of the scan converter or an analog 525 line 1:2 interlaced signal. The pre-processor prepares the respective input signal for input to a high definition B-MAC encoder. Alternatively, the pre-processor may generate its own test patterns, for example, in the event no input signal is provided. In the event the input signal is not digital, for example, a signal from a wideband 525 line 1:2 analog RGB source, the pre-processor digitizes the input signal and separates the signal into luminance and chrominance components.

The respective digital luminance signal is comb filtered at high frequency and then decimated at 2:1 to reduce the sampling rate. The respective digital chrominance signal is merely delayed and not otherwise processed to match the delay in comb filtering and decimating the luminance signal. The preprocessed luminance and chrominance signals are then provided to a high definition B-MAC encoder. At a receiver site, comb filtering is also applied at a B-MAC decoder according to the present invention.

Further features of the present invention will become evident from the following detailed description in view of the drawings which also describe the remaining components of the high definition B-MAC television signal transmission system, the B-MAC encoder, the radio frequency or other equipment for transmitting and receiving the encoded B-MAC signal and the B-MAC decoder.

BRIEF DESCRIPTION OF THE DRAWINGS

FIG. 1 is an overall schematic block diagram of a high definition B-MAC television signal transmission system according to the present invention, FIG. 1a showing components for processing and encoding a studio produced high definition television signal for transmission over a transmission link and FIG. 1b showing components for receiving and decoding the signal transmitted over the transmission link.

FIG. 2 provides details of an 1125/525 line scan converter component according to FIG. 1a, FIG. 2a showing a line waveform of a high definition television signal, FIGS. 2b and 2c providing details of the conversion process, FIG. 2d providing a block schematic diagram of a converter according to the present invention, FIG. 2e providing a detailed schematic drawing of an alternative embodiment of the converter of FIG. 2d and FIG. 2f showing a graph of amplitude versus vertical frequency for an interpolator/filter of the scan converter.

FIG. 3 is a block schematic diagram of a pre-processor component according to FIG. 1a.

DETAILED DESCRIPTION

Figure 1A:
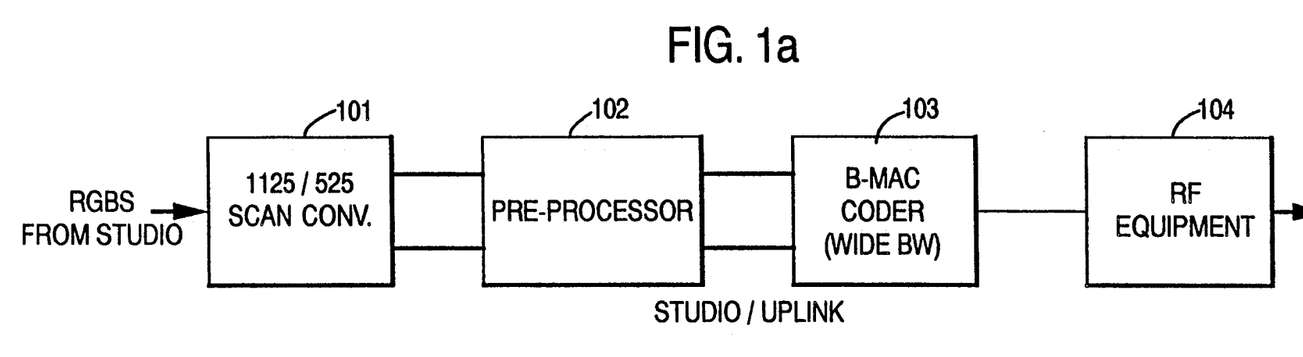

Referring now to FIG. 1, there is shown a block schematic diagram of a high definition B-MAC television signal transmission system in accordance with the present invention. Referring first to FIG. 1a, an analog high definition RGB or other high definition signal is provided as an input signal to the present system from a broadcast studio. Typically, the signal may be in accordance with the Japanese MUSE 1125 line 2:1 interlaced signal format at a 60 Hertz field rate because of the predominance of existing M.U.S.E. studio equipment. However, other signal formats are possible such as a 525 line 1:1 analog or digital format or a 1050 line 2:1 analog or digital format at a 59.94 Hertz field rate.

At the output of FIG. 1a is a B-MAC encoded baseband signal modulated to radio frequencies for transmission. Transmission may be via satellite, microwave, coaxial cable, fiber or other transmission medium. For example, the B-MAC encoded output may also be conveniently frequency modulated for transmission over optical fiber.

A scan converter 101 is provided for converting an 1125 line 1:2 60 Hertz field rate signal format into a 525 line 1:1 signal format with field rate conversion from 60 Hertz to 59.94 Hertz. Also, a 1050 line 1:2 60 Hertz field rate signal may be input. A signal input of 525 line analog 1:2 may be provided directly to pre-processor 102.

Regardless of which signal is provided at either scan converter 101 or pre-processor 102 gamma correction may be already applied to an input signal in accordance with well known techniques. For improved image quality, an inverse gamma function may be applied to remove gamma correction prior to comb filtering and gamma reapplied subsequent to the filter and prior to transmission. In a similar manner, comb filtering at a high definition decoder may be preceded by a gamma removal circuit and followed by a gamma correction stage. This technique is commonly referred to as constant luminance processing.

Pre-processor 102 then receives either another high definition studio input signal or a converted output signal of the scan converter 101. Furthermore, for example, in the event of an absence of input signal, a high definition test pattern image may be generated at pre-processor 102. Either of these is comb filtered and decimated for output to high definition B-MAC encoder 103 to an appropriate sampling rate.

Pre-processor 102 and a high definition B-MAC encoder 103 are preferably in accordance with U.S. application Ser. No. 272,064 filed Oct. 11, 1988 in the name of the present inventor. A wide bandwidth high definition B-MAC signal is provided into which high frequency horizontal detail information is folded by the process described therein.

The output of the encoder 103 is a 10.7 megahertz high definition B-MAC baseband signal for transmission by transmission equipment 104. As described above, transmission may be via satellite, or over land line and by radio frequency including microwave and lightwave frequencies. The baseband B-MAC signal is modulated to these carrier frequencies by any known technique.

Figure 1B:
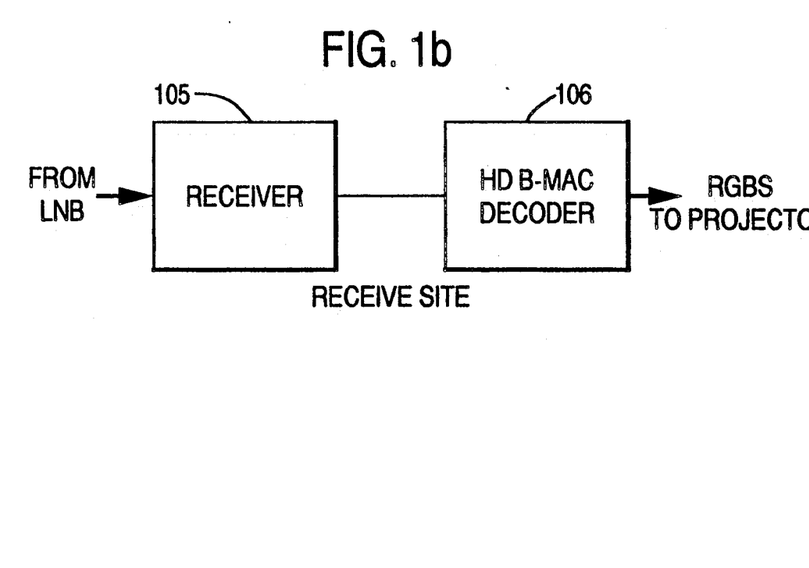

Referring now to FIG. 1b, there is shown a block schematic diagram of components of the present high definition B-MAC television signal transmission system which are located at a receiver site. Component 105 is a receiver capable of receiving signals transmitted over a transmission link connecting equipment 104 with receiver 105 i.e. satellite, microwave, optical fiber, coaxial cable or other radio or light frequency transmission link. RF transmission equipment 104 or receiver 105 may be any equipment for modulating a baseband, approximately 10.7 megahertz, signal on to a carrier frequency for transmission and reception depending on the transmission medium chosen.

Receiver 105 of FIG. 1b provides a baseband B-MAC encoded high definition television signal to high definition B-MAC decoder 106. Details of high definition B-MAC decoder 106 are found in U.S. application Ser. No. 272,064 filed Nov. 16, 1988 and incorporated herein by reference. Furthermore, a line doubling component of decoder 106 is described by U.S. application Ser. No. 255,328 filed Oct. 11, 1988 and incorporated herein by reference. The line doubler improves vertical resolution, especially of still images.

Encoder 103 and decoder 106 together comprise a high definition B-MAC transmission system which assumes transmission by RF equipment 104 and receiver 105 over a single wideband channel. An alternative approach to high definition B-MAC transmission system design is to encode a first standard resolution television signal for transmission in B-MAC and also encode a so-called augmentation signal for transmission over a second standard bandwidth channel. Upon reception, the augmentation signal may be used with the standard resolution signal to augment its resolution and aspect ratio to high definition and 16:9 aspect ratio respectively. Such an augmentation channel approach to the design of high definition B-MAC encoding and decoding equipment and processes is described by U.S. application Ser. No. 228,274 filed Aug. 4, 1988 and incorporated herein by reference.

The following detailed discussion of a high definition B-MAC television signal transmission system assumes an approach as disclosed by U.S. application Ser. No. 272,064 of Nov. 16, 1988. Nevertheless, scan converter 101, as described herein, may be used with either system. Furthermore, the principles of the present invention as represented by scan converter 101 clearly may have more generic application and may be employed any time conversion is required from 1125 or 1050 to 525 lines, from interlaced to sequential scan or interlaced, and from a 60 Hertz field rate to a field rate of 59.94 Hertz.

Components of the high definition television system will now be described individually in accordance with FIGS. 2–5. Referring first to FIG. 2 and in particular to FIGS. 2a–f, scan converter 101 will be described in particular detail.

Figure 2A:
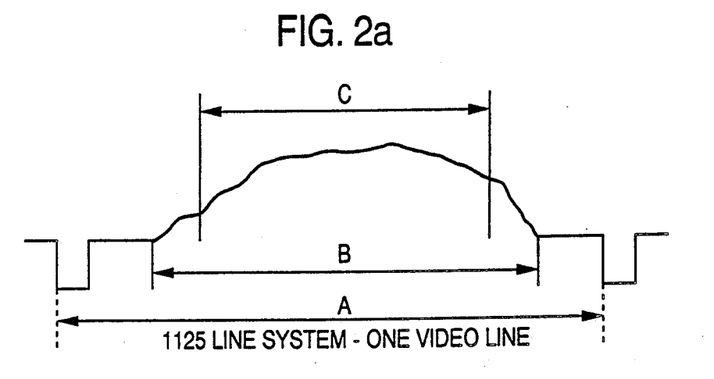

Referring first to FIG. 2a, a waveform of one line of a typical high definition television signal is shown for the purpose of defining relevant portions of the signal and characterizing the present invention in terms of preferred digital sampling rates for sampling the input analog signal and writing or reading data into and out of field stores for storing fields of high definition video samples.

According to FIG. 2a, from the leading edge of a first synchronizing pulse to the leading edge of the next may define a portion A for a total line period of a high definition television signal waveform. Because of the high definition features of the MUSE format, the total active portion B of the line exceeds a portion C of the line to be retained. While portion C as shown may suggest that the portion of a line of a field to be retained should be a central portion and that equal portions at the edges of each line should be cropped, such is not necessarily applicant's invention. For example, it is taught in U.S. Pat. No. 4,651,208, incorporated herein by reference, that an active portion of a field, i.e., the location of the central focus of the image action, may vary with the image represented by the signal. Consequently, it may be appropriate to sense the location of the action and then determine that portion of the active line to be cropped on a field by field or frame by frame basis. For the purpose of the following discussion, however, it will be assumed that portion C is located equidistant from the ends of the active line portion B.

TABLE 1

| Lines/Frame | Interlace | Active Lines | Frame Rate | Line Rate | Active/Total line ratio |
|---|---|---|---|---|---|
| 1125 | 1:2 | 1035 | 60.00 | 33750 | 1920/2200 |
| 1050 | 1:2 | 966 | 59.94 | 31486 | 1500/1820 |
| 525 | 1:1 | 486 | 59.94 | 31486 | 1500/1820 |
| 525 | 1:2 | 486 | 59.94 | 15734 | 750/910 |

Now from the above table describing various known television formats, a sampling rate may be derived for sampling an input analog signal. For example, for an 1125 line signal the active line to total line ratio is represented by:

$$B/A = 1920/2200.$$

The incoming 1035 active lines of the 1125 line signal are first reduced to 966 active lines (corresponding to a 1050 line standard signal) by removing 35 active lines from the top and 34 active lines from the bottom of the active picture, a total of 69 active lines. The 69 active line reduction corresponds to a total line reduction of 1125−1025=75 lines. This signal can now be processed as a 1050 line 1:2 standard signal. The following interlace-to-sequential conversion process is thereby considerably simplified. In order to maintain correct aspect ratio, the edges of the picture must also be cropped to reduce the active line length by a factor of 69/1035=6.7%. Consequently, this same factor of .067 is used for determining the retained line to active line ratio: C/B=1−0.067=0.933.

Now the number of samples per line may be calculated from the following equation based on the desired active line of 1500 samples from Table 1:

$$1500*1/0.933*2200/1920 = 1842.18 \text{ samples/total line}$$

Because of sampling standards used in existing B-MAC encoding equipment, 1,500 samples are assigned to the active picture portion remaining after the cropping of edges.

To simplify sample generation, the rate calculated is adjusted to 1840 samples/line which results in the following sampling frequency:

$$\text{Sampling frequency} = 33750*1840 = 62.1 \text{ MHz}$$

(luminance sampling rate)

A ¼ rate clock is used for sampling each chrominance component, or a sampling rate at 15.525 MHz.

Having demonstrated a calculation of an appropriate sampling rate and frequency, a block schematic diagram of a scan converter according to the present invention will be described in accordance with FIG. 2d. In particular, FIG. 2d shows a plurality of five circuit boards, B1–B5, which may comprise the present scan converter and briefly inside a box representing each board, the function of the board. These circuit boards may be arranged together in plug-in module form within a housing so that the scan converter may be generally used for format conversion whether or not a B-MAC application is intended.

Referring first to board B1, an analog RGB input is provided at 1125 lines and a separate synchronization input. The 1125 line analog video input is clamped, matrixed to luminance and chrominance components and then sampled in a conventional manner but at the 62.1 MHz (luminance) and 15.525 MHz (chrominance) sampling rates calculated above. The bandwidths of the 1125 line signal are approximately 20 MHz for luminance and 6 MHz for chrominance. These band widths may not be economically transmitted over long distances according to state of the art technology.

According to FIG. 2d, board B1 provides luminance data at 62.1 MHz and separate U/V chrominance data multiplexed into a 31.05 MHz data stream to board B2. Also, clock separated from signal at board B1 is distributed by board B1 to boards B2, B3 and B4 as required. The sync separator circuit of board B1 extracts horizontal and vertical sync signals from the 1125 line sync input and generates the required line-locked sampling clocks within board B1 and divides down clock signals and reference pulses for distribution to boards B2–B4.

Board B2 comprises a horizontal to vertical scan converter comprising two high definition luminance field stores and two chrominance field stores, each field containing 525 lines and 1500 luminance active samples per line (chrominance, 375). As samples are written into these field stores the lines at top and bottom of an image are ignored as described above. Luminance samples are written into one field store on a line-by-line basis, while the samples of the previous field are read from the other field store. Addressing of the field store for the read operation is organized so that successive samples represent vertical scans of the picture (top to bottom and from left to right). As will be described in discussing board B3, the read operation is adjusted to accommodate the requirements of the four parallel path processing of board B3. The chrominance samples are similarly processed in the two chrominance field stores. The respective luminance and chrominance output data streams to board B3 are at 62.1 MHz and 31.05 MHz (multiplexed) respectively.

Board B3 comprises the phase shifting transversal filter for filtering the output of board B2. The luminance component is separated into four paths each operating at a data rate of 15.525 MHz. The separate chrominance component is separated into two U/V paths also operating at data rates of 15.525 MHz. The luminance filtering is performed in four parallel paths because of the high luminance data rate at 62.1 MHz.

Each luminance path contains a single digital signal processing integrated circuit capable of an 8-tap transversal filter with (signed) 8 bit accuracy at continuous rates up to 20 MHz. Most conveniently, a custom integrated circuit Zoran Corp. 33891 DSP (Digital Signal Processor) may be applied for each of the six filters. Of course, if state of the art digital filter technology is eclipsed by new technology, the present invention may comprise a digital filter circuit of two or fewer separate paths operating at higher frequencies or with more filter terms or greater numerical accuracy.

According to the present invention, the filter coefficients are changed from field to field to perform a spatial line shifting of $\frac{1}{4}$ line or interpolation, either $\frac{1}{4}$ line up or $\frac{1}{4}$ line down. The values of the coefficients are reprogrammable via a controller (either by hardware logic circuits or by software and microprocessor). Different coefficients are employed for luminance and chrominance processing paths and a reduction of vertical resolution of chrominance signals is accomplished.

A "drop field" instruction is returned from board B4 to board B3 periodically as writing operations overtake reading operations in board B4 as will be subsequently described. Generally, however, the output data streams are now at 31.05 MHz for luminance and 15.525 MHz for chrominance which are applied as input to board B4. The output data represents vertical scans from a 525 line (horizontal) interlace picture.

Two parallel output data streams of 31.05 MHz for luminance and 15.525 MHz for chrominance may be provided to two parallel boards B4 to provide a 525 line sequential scan signal if desired.

Board B4 comprises vertical to horizontal scan conversion and also generates a drop field rate conversion from 60 Hz to 59.94 Hz. Board B4 in particular comprises three luminance and three chrominance field stores, each field containing 263 maximum lines and 1500 active samples per line (chrominance-375 samples). Alternate samples of luminance from board B3 are written into one of these three stores and the other samples provided on the parallel output path from board B3 are discarded if an interlace signal is desired, i.e., for B-MAC pre-processing. This discarding of alternate samples converts the picture signal from sequentially scanned format to interlaced (1:2) format. Samples are written into the field store using a clock derived from the incoming video (60 Hz field rate) via the clock lead from board B1. A detailed discussion of sync derivation for a 525 line format will be described in connection with a discussion of board B5.

Samples are read from the field store using a clock locked to a 59.94 Hz field rate provided by a clock lead from board B5. The addressing of the field stores is organized to convert the samples back into a horizontally scanned format.

As the reading clock rate is slower than the writing operation clock rate, a third field store buffers the reading and writing operation. Every 1000 fields, the buffer field store reaches its capacity at which point the writing operation is suspended for a field (i.e. one input field of samples is discarded). Also, the drop field instruction signal is transmitted to board B3. Each time the field is dropped, the drop field signal controls a toggling of the filter coefficients of the transversal filter so that up becomes down and down becomes up. In other words in the two fields surrounding the drop field the alternate lines of the previous field and the alternate lines of the next field are spatially shifted $\frac{1}{4}$ line in the same direction (instead of opposite directions). This avoids small vertical jumps in the output interlaced video if displayed. The control circuitry of board B4 generates the drop field signal sent to board B3 which controls the reversal (inversion) of the coefficients.

Chrominance data is processed in a similar manner to luminance data by board B4. The digital video is buffered and presented, with clock and timing pulses, in parallel format at an output of board B4. A digital video 525 line 1:2 format with luminance at 28.636 MHz and U/V multiplexed chrominance at 14.318 MHz is provided for output to a pre-processor 102 according to FIG. 1a.

Board B5 comprises a well known sync separator for separating sync from a standard 525 line interlaced sync signal. Horizontal and vertical pulses and line locked clocks required for reading operations of board B4 are generated at board B5. In the absence of input sync, the board may operate free running in a relatively stable manner.

While board B4 provides a digital 525 line 1:2 format output at 59.94 Hz, a digital to analog processor board (not shown) may be provided at the output of board B4 to convert the digital output to analog for more generic operation, for example, wideband RGB video, 525 line interlaced.

Also, a second board of the type B4 may be provided (not shown). The second board would be connected in parallel to accept a second parallel output from board B3 also at 31.05 MHz for luminance and 15.525 MHz for chrominance. The second vertical to horizontal scan converter would double the output storage capacity resulting in a 525 line sequential format at 59.94 Hz. As will be described subsequently, all spatially shifted samples will be applied as useful output instead of alternate samples.

Figure 2B:
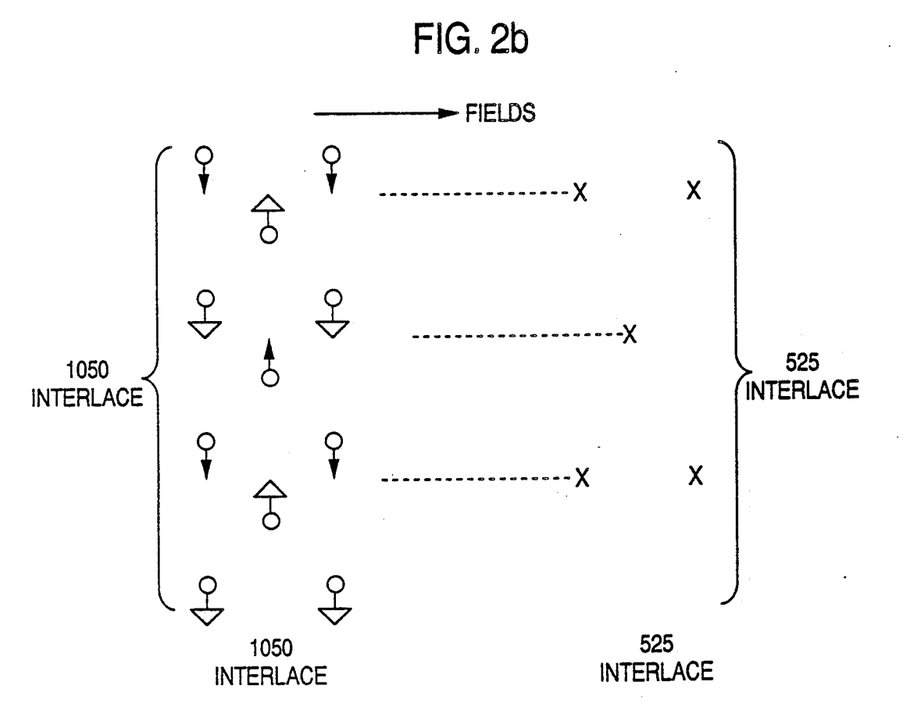

The above-described spatial shifting by $\frac{1}{4}$ line in subsequent fields is pictorially described by FIG. 2b. As field data moves from left to right, a 1050 line interlace signal format is converted to 525 line interlace signal format. A field comprises a limited number of lines for simplification of the drawing in which a first field comprises line samples which are shifted down by $\frac{1}{4}$ line while in the next field line samples are shifted up $\frac{1}{4}$ line. In other words, odd and even fields are spatially shifted in opposite directions. For an interlace output, all samples shown by, for example, an open pointed arrow are discarded. The X's represent the alternate samples in each field which have been spatially shifted ¼ line and are used after filtering in the resulting 525 line interlace output signal. The additional open arrow samples are provided as a second possible output of board B3 to a second board B4 to result in a 525 line sequential scan output.

Figure 2C:
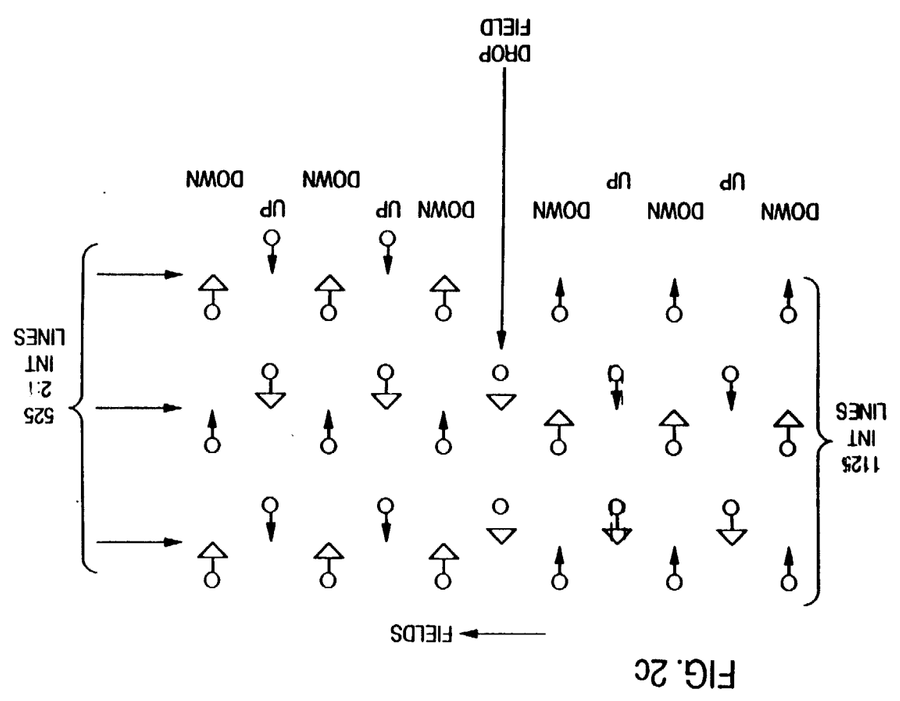
Figure 2D:
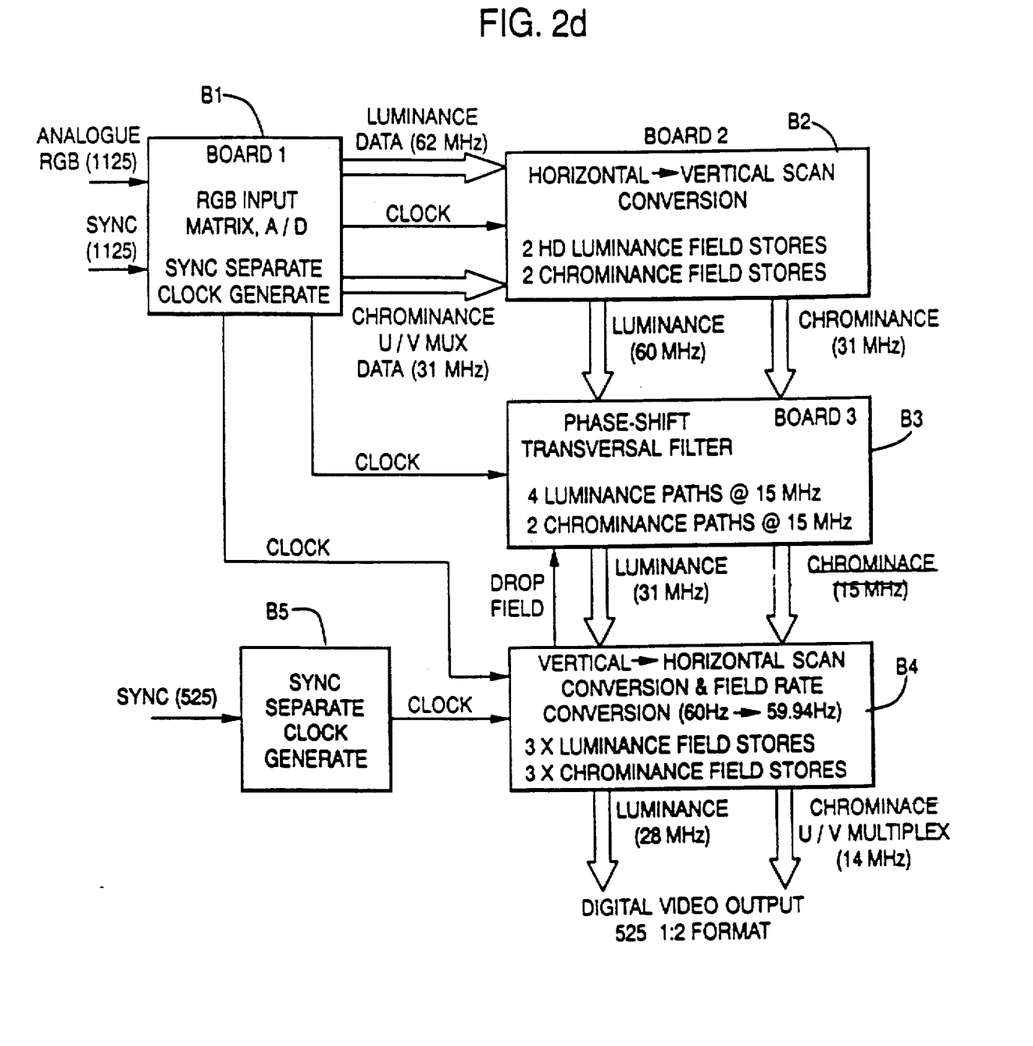

Field dropping and coefficient reversal are pictorially described by FIG. 2c which like FIG. 2b shows ¼ line shifting of alternate line samples in the interlace field signals. According to FIG. 2c, once a number of one thousand fields is reached an entire field of samples is dropped indicated by "drop field". At the same time, the field previous to the "drop field" and the field subsequent to the "drop field" will have alternate lines shifted in the same direction, according to the figure in this case, alternate lines of samples are shifted down. One thousand fields later, the two fields separated by a "drop field" have alternate lines shifted up ¼ line each.

The interpolator filter coefficients may be derived by a software approach from the following coding written in the BASIC language:

```
10    DIM X(21)
15    DIM Z(100)
20    Y = 0
30    For N = -10 to 10 STEP 1
40    PI = 3.14159
50    X(N + 11) = SIN (PI (N + .25))/ (PI * ( N + 25))
55    X(N + 11) = X(N + 11) * (.8* COS (N * PI/20) + .2)
60    Y = Y + X (N + 11)
70    NEXT N
80    FOR N = 1 to 21
90    X(N) = X(N)/Y
110   NEXT N
120   PRINT Y
135   CLS
140   SCREEN 2, 0, 0
150   PSET (0, 0)
160   LINE - (0, 150)
161   LINE - (640, 150)
162   PSET (0, 150)
163   K = 1
170   FOR F = 0 to 750 STEP 10
180   R = 0
190   I = 0
200   FOR J = 1 to 21
210   R = R = X(J) * COS ((J-11) * PI * F/500)
220   I = I - X(J) * SIN ((J-11) * PI * F/500)
230   NEXT J
231   LINE -(F * .8, 150 * (1- .5 * SQR (R * R+I*I)))
232   Z(K) = 50 * ATN (I/R)
233   K = K + 1
250   NEXT F
252   PSET (0, 75)
253   FOR K = 1 to 75
254   LINE -((K * 600/75), 75 - Z(K))
255   NEXT K
```

If it is assumed that the interpolator has a low-pass vertical response with a constant group delay, the filter will exhibit a sin x/x impulse response. The filter coefficients then are equal to the impulse response with a ¼ line offset or are given by the equation:

$$C_n = \frac{\text{SIN } B(N + \frac{1}{4})}{B(N + \frac{1}{4})}$$

where B is the vertical bandwidth. This is shown by line 50 of the above coding.

A window function (line 55) is applied to the coefficients to control ripples due to truncating the series of coefficients. By line 120 the coefficients are stored as X(N). Lines 210 and 220 relate to real and imaginary parts of the frequency response and line 232 to the phase.

As is known in the art, an arbitrary amount of vertical enhancement or alteration may be introduced by cascading a second transmission filter with coefficients $-a$, $(1+2a)$, $-a$, which has a zero phase characteristic and asymmetric coefficients $C(N) \neq C(-N)$ but where $C(N)$ up equals $C(-N)$ down. The bandwidth of the vertical interpolator is a trade between static vertical resolution in the final sequential scan display and aliassing (undesirable visibility of line structure and beat patterns) in the 525 line interlace display.

Figure 2E:
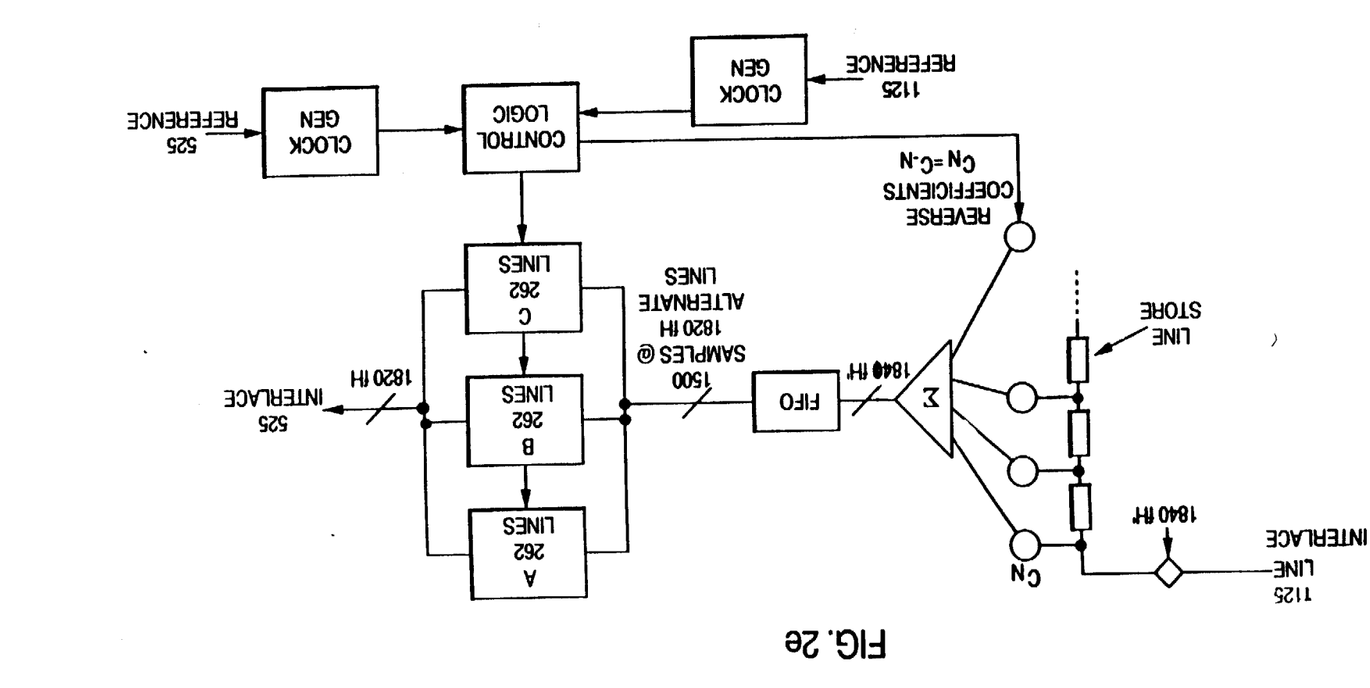
Figure 2F:
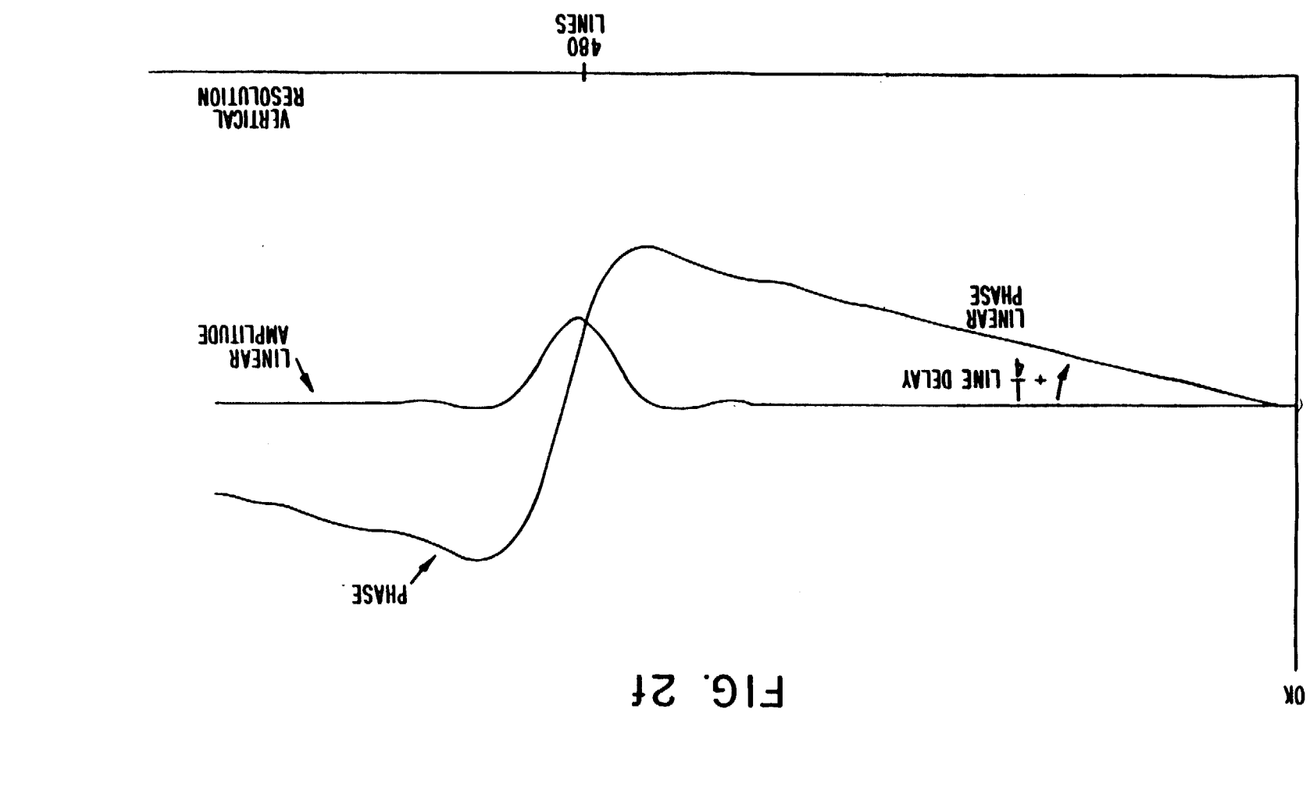

The result of the interpolator filter is shown by the graph of FIG. 2f which shows a graph of amplification versus vertical resolution for the filter determined above. A plus ¼ line delay by way of example, results in a downward linear phase with increasing vertical frequency until a vertical resolution of 480 lines is reached when thereafter the phase exceeds the linear amplitude.

Now referring to FIG. 2e, there is shown a detailed schematic drawing of an alternative embodiment of the converter shown in block form by FIG. 2d. In particular, the ¼ line spatial shifting and field dropping are shown in particular detail in an embodiment not involving a Zoran filter. An 1125 line interlace high definition input is sampled at 1840 $f_h'$ and stored in a plurality of line stores, where $f_h'$ is the horizontal frequency of 33750. Coefficients $C_N$ are calculated according to the above equations and applied to the stored samples which are then multiplexed at the same rate and provided to a first in first out (FIFO) circuit. Now 1500 samples at the sampling rate are provided to field stores A, B and C in the sequence A, B, C, A, B, C controlled by control logic circuits. Every 1000 fields, the coefficients for ¼ spatial line shifting are reversed and one field of samples collected in one of the field stores is dropped. At the output is read out a 525 line interlace digital output but at 1820 $f_h$, where $f_h$ is the 525 line rate of 31,486.

Figure 3:
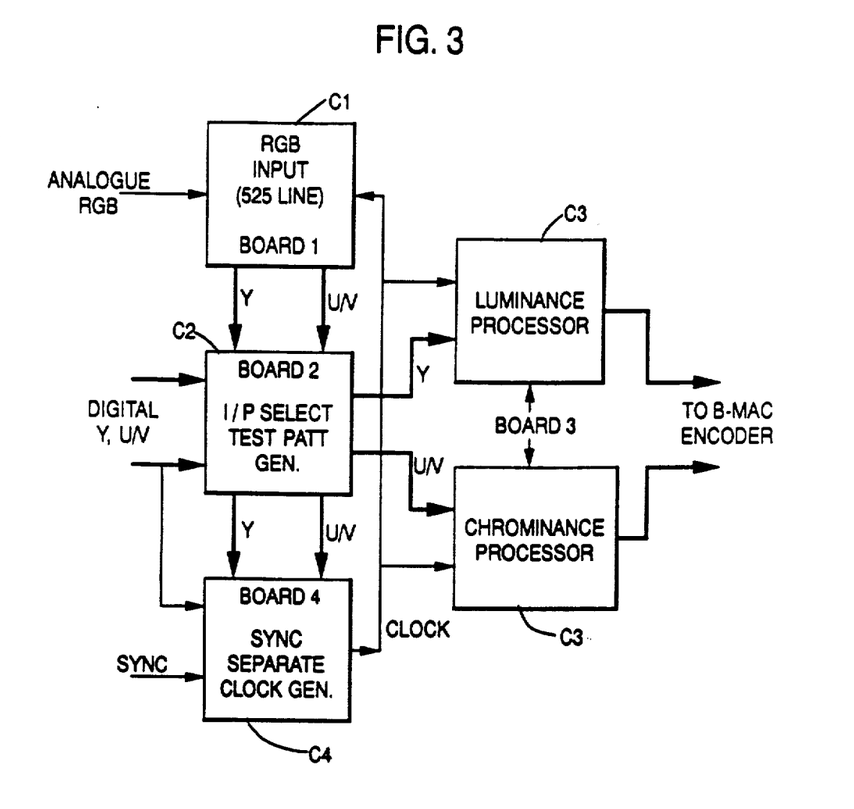

Referring now to FIG. 3, there is shown a block schematic diagram of a pre-processor for preprocessing the output of the converter of FIG. 2 or other input signals for encoding in B-MAC. The signal pre-processor of FIG. 3 is most easily constructed of a number of boards which may be housed in a plug-in module housing for ease of maintenance.

The high definition signal pre-processor accepts a 525 line interlace video signal from a wide-band analog RGB source at board C1 or in digital format at board C2 as separate luminance and chrominace outputs of board B4 of FIG. 2b, the 1125-525 line scan converter. As will be subsequently described, board C2 is also capable of generating its own test patterns. The pre-processor comb filters the luminance high frequency components before decimating at 2:1 the data to reduce the luminance sampling rate to 910 $f_h$. Chrominance is not otherwise processed than to delay the data stream to match the processing time for comb filtering and decimating the luminance data. The output is then provided to a B-MAC encoder.

At board C1 an analog RGB video signal is clamped, matrixed to luminance and chrominance components, filtered and sampled in a conventional manner. Bandwidths for luminance and chrominance are about 8.7 MHz and 3 MHz respectively. Sampling rates are at 28.636 MHz for luminance and 7.159 MHz for chrominance positioned orthogonally. Chrominance samples are multiplexed into a 14.318 MHz stream for distribution to the next board C2.

At board C2, an input from board C1 is accepted or the output of the scan converter of FIG. 2 is received. Also board C2 comprises a test pattern generator in the same luminance and chrominance format. A switch may determine which of three outputs is provided by board C2, test pattern, the signal from the scan converter or the signal from board C1.

Figure 4:
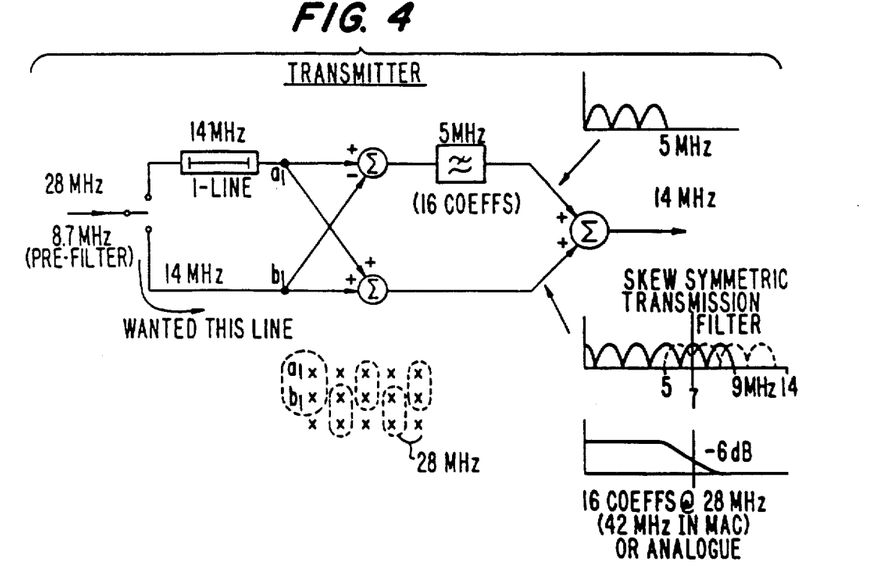
FIG. 4 is a detailed schematic diagram of a transmit portion of the pre-processor of FIG. 3.

Board C3 receives the selected output of board C2 and primarily comprises the comb filtering circuitry for the high frequency luminance signal. Referring briefly to FIG. 4, alternate luminance samples (at a rate of 28.636 MHz) are routed via two different paths at 14.318 MHz. The phase of the routing switch is reversed on alternate lines so that each path receives samples representing a quincunx sampled picture. The data rate in each path is 14.318 MHz, half the input rate. Samples in the upper path are passed through a line delay before combination with samples passed via the lower path. The lower path may include a single latch (not shown) to coordinate the timing of samples with those in the upper path. The co-timing of the upper and lower paths distorts the video signal by creating a line-to-line shift of plus or minus one half clock period which is corrected at the output of the B-MAC encoder.

The upper and lower paths of delayed and undelayed signals respectively are combined to obtain a line difference signal (the upper summation box) and a line average signal (the lower path) respectively. The line difference signal in the upper path is low pass filtered at a 5 MHz cutoff. The lower path shows a line average signal which may be delayed to compensate for the low pass filter delay and then is added to the upper path. At this point the skew symetric transmission filter for alleviating aliassing may be applied. The resulting digital signal is buffered and output to the B-MAC encoder.

Referring again to FIG. 3, a clocking board C4 takes composite sync and generates line locked clocks for distribution to the other boards of the pre-processor. Board C4 also generates and distributes line and frame related pulses required by the other boards. In the absence of an input sync signal, the clock circuit will free run in a relatively stable manner.

High definition B-MAC encoding is accomplished according to well known techniques. On the other hand, if an augmentation channel design approach is taken, the pre-processing must be accomplished differently so that a standard definition B-MAC signal will be encoded for transmission in addition to an augmentation channel comprising high resolution information and side panels for augmenting a 4:3 aspect ratio signal.

Figure 5:
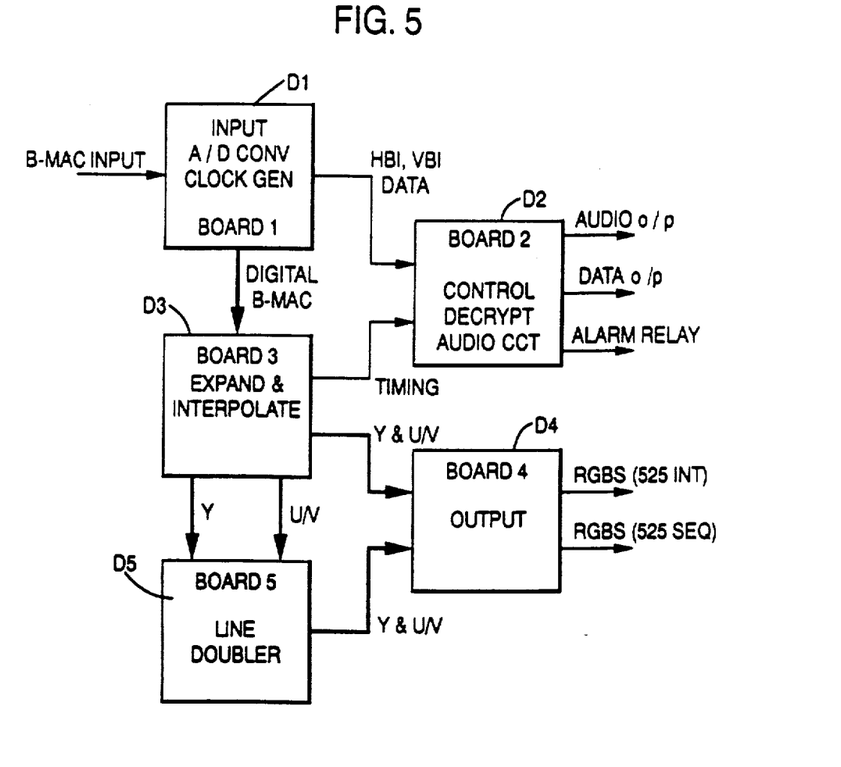
FIG. 5 is a functional block schematic diagram of a high definition B-MAC decoder of FIG. 1b.

Referring now to FIG. 5, a high definition B-MAC decoder most conveniently comprises five circuit boards, D1-D5.

The high definition B-MAC decoder takes a baseband B-MAC signal with a folded (aliassed) interleaved high-frequency spectrum as input, and outputs RGB video in two formats: standard 525 line interlaced, and 525 line sequentially scanned. It processes the folded spectrum to eliminate the alias and reconstructs an extended bandwidth luminance signal. This is achieved using a two dimensional (comb) filter. Many of the circuit elements in the decoder are functionally identical to those found in standard B-MAC decoders: only the significant differences are discussed below.

A first board D1 comprises an analog to digital converter and a clock generator. Incoming baseband B-MAC is filtered, clamped and de-emphasized. In this decoder, a filter with a root-skew-symmetric filter is used which exactly matches the output skew symetric transmission filter of the high definition B-MAC encoder. The combined filter characteristics of the encoder and decoder is a skew-symmetric form as required for proper reconstruction of the folded spectrum elements. A separate gaussian filter with a narrow bandwidth is used to reject noise from the data recovery circuit.

A de-emphasis network of board D1 includes a group delay compensating (equalizing) network corresponding to the compensated pre-emphasis network used in the high definition B-MAC encoder output. Compensation of the pre-emphasis characteristic reduces the amplitude of overshoots at sharp transitions, thus permitting a larger FM deviation to be used without encountering truncation effects at the receiver. The B-MAC video is sampled with a 21 MHz clock, but the clock phase used for sampling the luminance portion of the signal is reversed on alternate lines. The luminance signal is sampled using a quincunx pattern while the chrominance part of the multiplex is sampled orthogonally. Recovered vertical and horizontal interval data is sent to board D2 while digital B-MAC video is sent to board D3.

Board D2 comprises control circuitry for decryption (if scrambled B-MAC) and audio circuitry. The board performs the standard functions of interpreting the B-MAC Sync, System Data and other vertical interval data. From the vertical interval data, descrambling information is extracted and sent to board D1 (for quincunx sampling control) and board D3 (video descrambling and expansion functions). Horizontal interval audio data is decoded and output as a balanced signal. Utility data and re-assigned data demultiplexing and correction circuits are also located on this board. Sync and timing pulses used by other boards (i.e. board D3) are generated on board D2.

Figure 6:
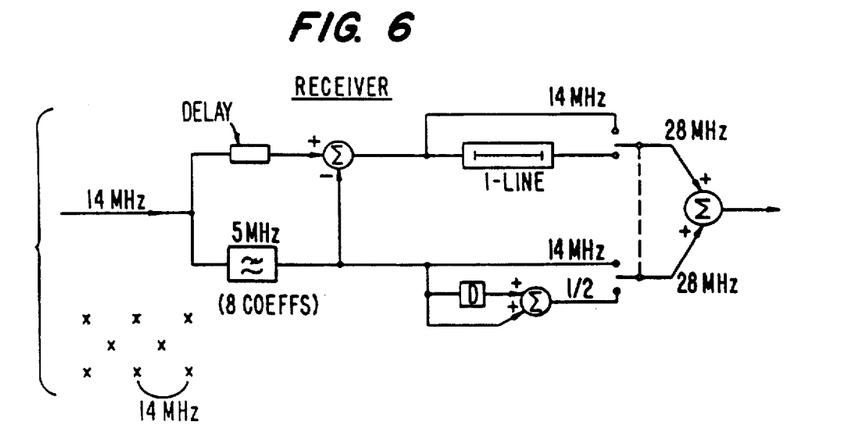
FIG. 6 is a detailed schematic diagram of a receive portion of the high definition B-MAC decoder of FIG. 5.

Board D3 comprises expansion and interpolation circuitry. Board D3 writes the digital B-MAC signal into line stores for descrambling and expansion. The luminance output of the line store is then comb filtered to remove alias components and reconstruct the high frequency signals. Referring briefly to FIG. 6, the comb filter is implemented by splitting the signal into low and high frequency paths (the lower and upper paths respectively). The high frequency signal is obtained by subtracting the output of each low pass filter from the unfiltered data. Each path is then split in two: a direct path and an interpolating path. For the high frequency signal, the interpolation is performed by inserting the sample from the preceding line. Due to quincunx sampling, this interpolation works well providing there is no high vertical frequency present. The low frequency signal interpolation is performed by averaging the adjacent samples. (Superior performance could be obtained by using a more complex low-pass filter characteristic.) Samples are selected alternately from the direct and interpolated paths at twice the input data (i.e. for each input sample, a direct and an interpolated sample is output: input rate is 14.3 MHz, output rate is 28.6 MHz). The high frequency and low frequency signals are then added together and output to board D4 (for wideband 525 line interlace display) and board D5 (for conversion to 525 line sequentially scanned format). The chrominance signal is processed in the normal way for B-MAC decoding, followed by a delay to compensate for the extra luminance processing.

In this implementation, teletex is inserted directly into the data stream by substituting teletext samples for video samples under the control of the teletext circuit on board D2.

Board D4 contains the digital-to-analog conversion circuits for both interlaced and sequential video outputs. Digital video is input from board D3 (interlaced) and board D5 (sequential). Each signal is D/A converted, filtered, matrixed and buffered for output as R, G and B signals.

Board D5 performs the line doubling task, using line and field stores to generate various interpolated values, selection of an appropriate value may be determined by a movement detection algorithm. Line doubling may be accomplished in accordance with the algorithm described by copending U.S. application Ser. No. 255,328, filed Oct. 11, 1988 and incorporated herein by reference. A data signal indicative of the algorithm to be applied may be transmitted with the B-MAC encoded signal. The transmitted control signal is decoded and selects the most appropriate line doubling algorithm to be applied.

I claim:

1. A method of converting a high definition television signal having a first number N of lines per frame to a high definition television signal having a second number M of lines per frame where N is greater than or equal to twice M, the method comprising the steps of
    sampling the high definition signal of N lines,
    ignoring a number of lines from the top and bottom of an image of the high definition signal if N is greater than 2M, the result being a signal of 2M lines,
    spatially shifting lines in each field by a fraction of a line, odd and even fields being shifted in opposite directions,
    counting the number of fields until a predetermined number,
    discarding one field of samples and
    reversing the direction of spatial shifting of samples from the previous field to the next field.

2. A conversion method according to claim 1 where the predetermined number of fields is 1000.

3. A conversion method of according to claim 1 in which every line is spatially shifted and all alternate samples, spatially shifted in opposite directions, are output as a sequential scan signal.

4. A conversion method according to claim 1 where the sampling is performed to achieve approximately a 10.7 megahertz rate.

5. A scan converter for converting a high definition television signal having a first number N of lines per frame to a high definition television signal having a second number M of lines per frame where N is greater than or equal to twice M, the scan converter comprising:
    an analog to digital converter for digitally converting an analog input television signal if an analog input television signal is provided,
    a horizontal to vertical scan converter circuit for converting a digital signal from horizontal to vertical scan and,
    a phase shift filter for spatially shifting the output of the horizontal to vertical scan converter circuit by a fraction of a line,
    first, second, and third field stores, the field stores operating at different writing and reading rates,
    a control circuit for controlling the first, second and third field stores and coefficients of the phase shift filter, and
    a control circuit for actuating a reversal of coefficients of the phase shift filter and discarding one field of line samples after a predetermined number of fields.

6. A scan converter according to claim 5, the fraction of a line being one quarter line, all alternate sample outputs of the filter shifted in opposite directions thereby providing a sequential scan signal.

7. A scan converter according to claim 5, the predetermined number of fields being 1000 fields.

8. A method of converting a high definition television signal having a first number N of lines per frame to a high definition television signal having a second number M of lines per frame where N is greater than or equal to twice M, the method comprising the steps of:
    sampling the high definition signal of N lines,
    spatially shifting lines in each field by a fraction of a line, odd and even fields being shifted in opposite directions,
    counting the number of fields until a predetermined number,
    discarding one field of samples, and
    reversing direction of spatial shifting of samples from the previous field to the next field.

9. A conversion method according to claim 8 where the predetermined number of fields is 1,000.

10. A conversion method according to claim 8 where N is 1125 lines and M is 525 lines and the fraction of a line is ¼ line.

11. A conversion method according to claim 8 where N is 1050 lines and M 525 lines and a fraction of a line is ¼ line.

12. A method of converting a high definition television signal having a first number N of lines per frame to a high definition television signal having a second number M of lines per frame where N is greater than or equal to twice M, the method comprising the steps of:
    sampling the high definition signal of N lines,
    selectively ignoring a number of lines of an image of the high definition signal if N is greater than 2M, the result being a signal of 2M lines,
    spatially shifting lines in each field by a fraction of a line, odd and even fields being shifted in opposite directions,
    counting the number of fields until a predetermined number,
    discarding one field of samples and
    reversing direction of spatial shifting of samples from the previous field to the next field.

13. A conversion method according to claim 12 where the selectively ignored lines are determined as those from the step of sensing the location of a central focus of image action.

14. A conversion method according to claim 13 wherein the step of selectively ignoring lines is accomplished by the step of cropping on a field by field basis.

15. A conversion method according to claim 13 wherein the step of selectively ignoring lines is accomplished by the step of cropping on a frame by frame basis.

* * * * *

UNITED STATES PATENT AND TRADEMARK OFFICE
CERTIFICATE OF CORRECTION

PATENT NO. : 4,989,091

DATED : January 29, 1991

INVENTOR(S) : Keith Lucas

It is certified that error appears in the above-identified patent and that said Letters Patent is hereby corrected as shown below:

The drawing sheets, consisting of Figs. 2c-2f and 3-6, should be added as shown on the attached pages.

Signed and Sealed this

Eighteenth Day of May, 1993

Attest:

MICHAEL K. KIRK

Attesting Officer

Acting Commissioner of Patents and Trademarks